US009685805B2

(12) United States Patent
Chen et al.

(10) Patent No.: US 9,685,805 B2
(45) Date of Patent: Jun. 20, 2017

(54) ASSEMBLED ELECTRONIC APPARATUS AND CONTROL METHOD THEREOF

(71) Applicants: Kai-Yi Chen, Taipei (TW); Hsiu-Hang LIn, Taipei (TW); Ching-Wen Sun, Taipei (TW); Pin-Yu Chou, Taipei (TW); Yu-Tzu Hsu, Taipei (TW); Chia-Ni Chen, Taipei (TW); Wei-Cheng Chuang, Taipei (TW); Ming-Feng Liu, Taipei (TW)

(72) Inventors: Kai-Yi Chen, Taipei (TW); Hsiu-Hang LIn, Taipei (TW); Ching-Wen Sun, Taipei (TW); Pin-Yu Chou, Taipei (TW); Yu-Tzu Hsu, Taipei (TW); Chia-Ni Chen, Taipei (TW); Wei-Cheng Chuang, Taipei (TW); Ming-Feng Liu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 178 days.

(21) Appl. No.: 14/334,678

(22) Filed: Jul. 18, 2014

(65) Prior Publication Data
US 2015/0130700 A1    May 14, 2015

Related U.S. Application Data

(60) Provisional application No. 61/904,443, filed on Nov. 14, 2013.

(51) Int. Cl.
*H02J 7/00* (2006.01)
*G04R 60/12* (2013.01)
(Continued)

(52) U.S. Cl.
CPC .......... *H02J 7/0045* (2013.01); *A44C 5/0007* (2013.01); *G04R 60/12* (2013.01);
(Continued)

(58) Field of Classification Search
CPC ...... H02J 7/0013; H02J 7/0052; H02J 7/0027; H02J 7/0044; H02J 7/0045; G06F 1/1626;
(Continued)

(56) References Cited

U.S. PATENT DOCUMENTS 6,137,473 A * 10/2000 Cortopassi ............ G06F 1/1613
345/156
2005/0093868 A1    5/2005 Hinckley
(Continued)

OTHER PUBLICATIONS

"Office Action of Taiwan Counterpart Application", issued on Sep. 25, 2015, p. 1-p. 4.

*Primary Examiner* — Sahlu Okebato
(74) *Attorney, Agent, or Firm* — Jianq Chyun IP Office

(57) ABSTRACT

An assembled electronic apparatus and a control method thereof are provided. The assembled electronic apparatus includes a first body and a second body. A second processor shares a partial content of a sensing record generated by a sensing module through a second information sharing module. The first body and the second body are connected with each other through the first connector and the second connector. After being connected with each other, a message is transmitted by one of the first processor and the second processor to another one of the first processor and the second processor, so that a function is executed by the another one of the first processor and the second processor through the corresponding first processor or the corresponding second processor according to the message. The first processor shares a content of the sensing record generated by the sensing module through a first information sharing module.

11 Claims, 5 Drawing Sheets

(51) Int. Cl.
  *G06F 1/16*    (2006.01)
  *H01Q 1/27*    (2006.01)
  *G06F 3/01*    (2006.01)
  *A44C 5/00*    (2006.01)
  *G06F 1/26*    (2006.01)

(52) U.S. Cl.
  CPC ............ *G06F 1/163* (2013.01); *G06F 1/1613* (2013.01); *G06F 1/1626* (2013.01); *G06F 1/1654* (2013.01); *G06F 1/26* (2013.01); *G06F 3/014* (2013.01); *H01Q 1/273* (2013.01); *H02J 7/0044* (2013.01); *H02J 7/0013* (2013.01); *H02J 7/0027* (2013.01); *H02J 7/0052* (2013.01)

(58) Field of Classification Search
  CPC ........ G06F 1/26; G06F 1/1613; G06F 1/1654; G06F 3/014; G06F 1/163; A44C 5/0007; H01Q 1/273; G04R 60/12
  See application file for complete search history.

(56) References Cited

U.S. PATENT DOCUMENTS

| | | | |
|---|---|---|---|
| 2010/0112964 A1 | 5/2010 | Yi et al. | |
| 2011/0210959 A1* | 9/2011 | Howard | G01S 5/12 345/418 |
| 2012/0075177 A1* | 3/2012 | Jacobsen | G06F 3/011 345/156 |
| 2013/0257763 A1* | 10/2013 | Lee | G06F 3/0412 345/173 |

\* cited by examiner

ASSEMBLED ELECTRONIC APPARATUS AND CONTROL METHOD THEREOF

CROSS-REFERENCE TO RELATED APPLICATION

This application claims the priority benefits of U.S. provisional application Ser. No. 61/904,443, filed on Nov. 14, 2013. The entirety of the above-mentioned patent application is hereby incorporated by reference herein and made a part of this specification.

BACKGROUND OF THE INVENTION

Field of the Invention

The invention relates to an assembled electronic apparatus, and more particularly, relates to a wearable assembled electronic apparatus having a first body and a second body and a control method thereof.

Description of Related Art

With advancement in technology, compact and portable electronic apparatuses such as smart phones and tablet computers have became a part of human life. Further, with miniaturization and parity of the electronic apparatus, wearable apparatuses such as smart watches, smart glasses and medical sensors have also been increasingly introduced in the market.

Generally, a wearable apparatus refers to an micro electronic apparatus with specific functions (e.g., positioning, physiology sensing, etc.) which is wearable, and in addition to providing instant information (e.g., navigation, facial recognition, surrounding information, etc.) and recording statuses of people (e.g., mobile record, physiological detection, etc.), the wearable apparatus may also serve as an auxiliary product for other electronic apparatuses (e.g., smart phones, tablet computers, desktop computers, etc.). By utilizing technologies such as mobile computing, ambient intelligence, ubiquitous computing (ubicomp), a wearable technology can be designed and applied for various fields including sport, fitness, fashion, casual hobby and medical. Accordingly, people can wear the wearable apparatus for instantly or continuously executing the functions of the wearable apparatus without affecting human activities, so as to use the specific functions provided by the wearable apparatus for assisting people's lives.

SUMMARY OF THE INVENTION

The invention is directed to an assembled electronic apparatus and a control method thereof, and capable of connecting a first body and a second body thereof, so as combine functions of the two bodies for co-operation.

The invention provides an assembled electronic apparatus, and the assembled electronic apparatus includes a first body and a second body. The first body includes a first connector, a first information sharing module and a first processor, and the first processor is coupled to the first information sharing module and the first connector. The second body includes a second connector, a second information sharing module, a sensing module and a second processor, and the second processor is coupled to the second information sharing module, the sensing module and the second connector. The second processor shares a partial content of a sensing record generated by the sensing module through the second information sharing module. The first body and the second body are connected with each other through the first connector and the second connector. After being connected with each other, a message is transmitted by one of the first processor and the second processor to another one of the first processor and the second processor, so that a function is executed by the another one of the first processor and the second processor through the corresponding first processor or the corresponding second processor according to the message. The first processor shares a content of the sensing record generated by the sensing module through the first information sharing module. In addition, the information sharing module as described in the invention is capable of sharing the sensing record generated by the sensing module (including one single or integrated information for visual, auditory, tactile, olfactory and gustatory properties) to the user through the information sharing module. In the following embodiments, a first information sharing module may be one of a wireless communication module and a display module, or a combination thereof, and a second information sharing module may be one of a second display module, a light module, a vibration module or a speaker module, or a combination thereof. However, the invention is not limited thereto. The first information sharing module and the second information sharing module may be the same one or different ones of a display module, a light module, a vibration module, a wireless communication module, a touch module, a scent module or a speaker module, or a combination thereof, and a content of the sensing record shared by the first information sharing module is different from a content of the sensing record shared by the second information sharing module.

In an embodiment of the invention, the first information sharing module is one of a wireless communication module or a display module, or a combination thereof.

In an embodiment of the invention, the second information sharing module is one of a second display module, a light module, a vibration module or a speaker module, or a combination thereof.

In an embodiment of the invention, when the first body and the second body are connected with each other, the first processor executes the function to transmit the sensing record through the wireless module to an external apparatus.

In an embodiment of the invention, the sensing module includes one of a biosensor, an oxygen sensor, a heartbeat sensor, a temperature sensor, a position sensor and a G sensor, or a combination thereof. The sensing module generates a sensing signal, and the second processor generates the sensing record according to the sensing signal.

In an embodiment of the invention, the second body further includes a memory module, and the memory module is coupled to the second processor. When the first body and the second body are not connected with each other, the second processor stores the sensing record in the memory module.

In an embodiment of the invention, the second body further includes a first input module, and the first input module is coupled to the second processor. When the first body and the second body are connected with each other, the second processor transmits an input signal generated by the first input module to the first processor, and the first processor executes the function to display the input signal through the first information sharing module.

In an embodiment of the invention, the first body further includes a second input module, and the second input module is coupled to the first processor. When the first body and the second body are connected with each other, the first processor transmits an input signal generated by the second input module to the second processor, and the first processor executes the function to correspondingly activate the sensing module in the second body according to the input signal.

In an embodiment of the invention, the first body further includes a first battery, and the first battery is coupled to the first processor. The second body further includes a second body, and the second body is coupled to the second processor. The first processor and the second processor determine a first capacity of the first battery and a second capacity of the second battery for each other, and transmit the first capacity of the first battery and the second capacity of the second battery to each other. If the first capacity is less than a first threshold and the second capacity is greater than a second threshold, the second processor executes the function to provide power from the second battery to the first body.

In an embodiment of the invention, the second body further includes a charging unit. The charging unit is coupled to the second processor and the second battery, and the second processor charges the second battery through the charging unit.

In an embodiment of the invention, when the first body and the second body are connected with each other, the second processor compares the first capacity with the second capacity, so as to determine a sequence for charging the first battery and the second battery through the charging unit.

From another perspective, the invention provides a control method of an assembled electronic apparatus, and the control method includes the following steps. A first body and a second body of the assembled electronic apparatus are connected with each other. A sensing record is generated by the sensing module of the second body. A content of the sensing record is shared through one of a first information sharing module of the first body and a second information sharing module of the second body.

In an embodiment of the invention, the following steps are further included. The sensing record is transmitted through the first information sharing module of the first body to an external apparatus.

In an embodiment of the invention, the content of the sensing record shared by the first information sharing module of the first body is different from the content of the sensing record shared by the second information sharing module of the second body.

Based on above, according to the embodiments of the invention, by connecting the first body and the second body of the assembled electronic apparatus, the first body and the second body may transmit the message to each other to execute the corresponding function, and share the contents of the sensing record generated by the sensing module through the first and second information sharing modules respectively. Accordingly, the first body and the second body which capable of operating independently may be connected together to transmit data, and the functions of the two bodies may be combined for co-operation.

To make the above features and advantages of the disclosure more comprehensible, several embodiments accompanied with drawings are described in detail as follows.

DESCRIPTION OF THE EMBODIMENTS

A wearable apparatus completely different from other technologies is proposed according to embodiments of the invention, in which two electronic apparatuses separated from each other and capable of operating independently are served as a display body and a carrier body respectively, and said two bodies can be assembled into one assembled electronic apparatus. The display body includes a display screen (which is not provided by the carrier body) and a wireless communication module for transmission with the outside, whereas the carrier body includes a sensing module (which is not provided by the display body) for sensing statuses of a user. Accordingly, the two bodies can be connected with each other as complementation for insufficiency in terms of structural members. In order to combine the two electronic apparatus bodies which are capable of operating independently, an assembled electronic apparatus and a control method thereof are proposed according to the embodiments of the invention. The assembled electronic apparatus includes a display body and a carrier body. After the display body and the carrier body are connected with each other, the display body is capable of displaying or transmitting a sensing record generated by a sensing module of the carrier body, and executing corresponding sensing functions according to a status selection signal generated by operations from the user. Accordingly, the display body and the carrier body can transmit data to each other, and combine the functions of each other for co-operation. In addition, the information sharing module as described in the invention is capable of sharing the sensing record generated by the sensing module (including one single or integrated information for visual, auditory, tactile, olfactory and gustatory properties) to the user through the information sharing module. In the following embodiments, a first information sharing module may be one of a wireless communication module and a display module, or a combination thereof, and a second information sharing module may be one of a second display module, a light module, a vibration module or a speaker module, or a combination thereof. However, the invention is not limited thereto. The first information sharing module and the second information sharing module may be the same one or different ones of a display module, a light module, a vibration module, a wireless communication module, a touch module, a scent module or a speaker module, or a combination thereof, and a content of the sensing record shared by the first information sharing module is different from a content of the sensing record shared by the second information sharing module.

Figure 1:
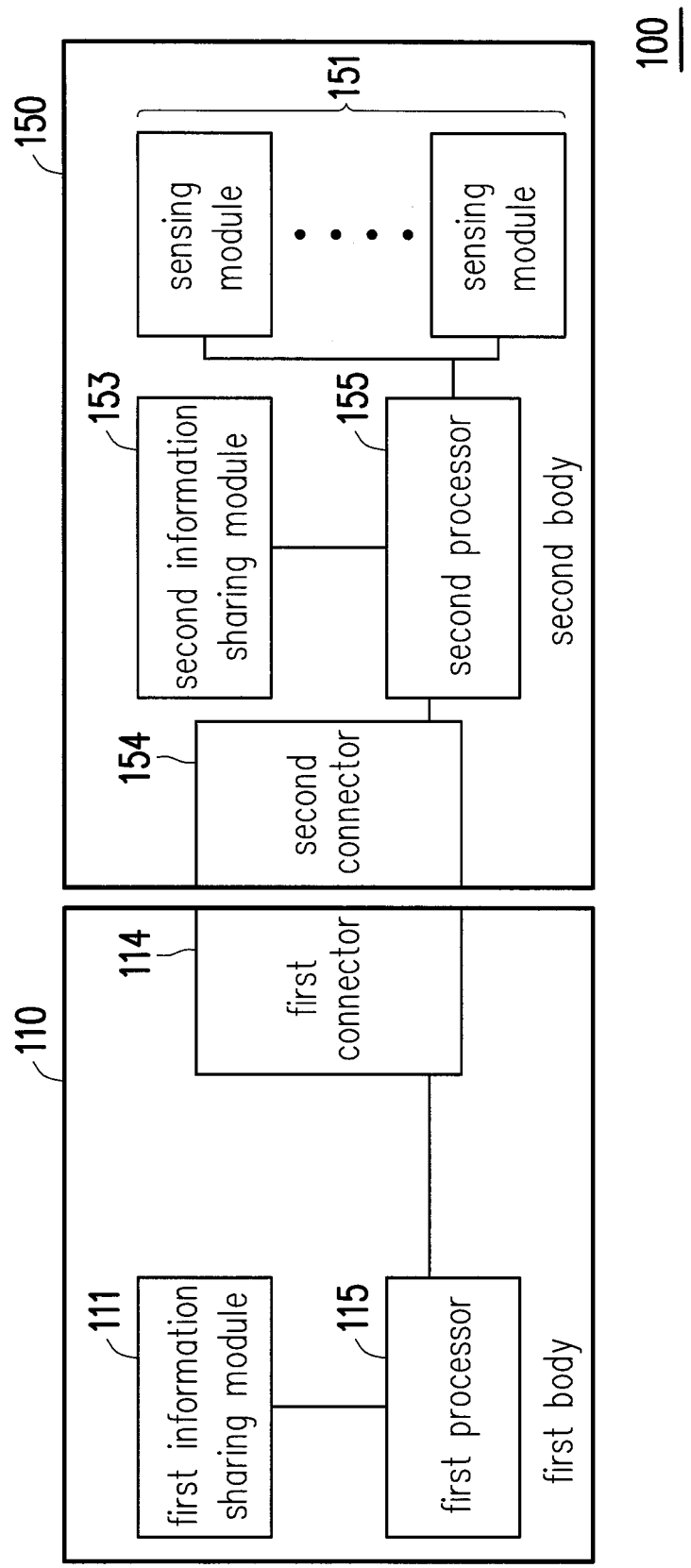
FIG. 1 is a block diagram illustrating an assembled electronic apparatus according to an embodiment of the invention.

FIG. 1 is a block diagram illustrating an assembled electronic apparatus according to an embodiment of the invention. Referring to FIG. 1, an assembled electronic apparatus 100 includes a first body 110 (i.e., the display body) and a second body 150 (i.e., the carrier body).

The first body 110 includes a first information sharing module 111, a first connector 114 and a first processor 115. The first information sharing module 111 may be one of a wireless communication module or a display module, or a combination thereof, wherein the wireless communication module may be a bluetooth module, an infrared ray (IR) module, a WiFi module, a near field communication (NFC) module, a radio frequency identification (RFID) module or any other type of wireless communication module with a wireless transmission function. The display module may be a display (e.g., a liquid crystal display (LCD), an organic electro-luminescent display (OELD), etc.) with a touch control function (e.g., touch control technologies of capacitive-type, resistive-type, optical-type, etc.).

The first connector 114 may be a connector composed of an inter-integrated circuit (I2C) interface, a serial peripheral interface (SPI), a universal asynchronous receiver-transmitter (UART) or a universal serial bus (USB), a specific pin (e.g., for data, power or synchronization) or any other type of connector.

The first processor 115 is coupled to the first information sharing module 111 and the first connector 114. The first processor 115 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements. In the present embodiment, the first processor 115 is configured to process all operations of the first body 110 of the present embodiment.

The second body 150 includes a sensing module 151, a second information sharing module 153, a second connector 154 and a second processor 155. The sensing module 151 may be one of a biosensor, an oxygen sensor, a heartbeat sensor, a temperature sensor, a position sensor and a G sensor, or a combination thereof. The second information sharing module 153 may be one of a second display module, a light module, a vibration module or a speaker module, or a combination thereof. An exemplary example of the second connector 154 may refer to related description of the first connector 114, which is not repeated hereinafter.

The second processor 155 is coupled to the sensing module 151 and the second information sharing module 153. The second processor 155 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements. In the present embodiment, the second processor 155 is configured to process all operations of the second body 150 of the present embodiment.

In the present embodiment, the first body 110 may be loaded with real-time operation system (RTOS), embedded Linux, Window Mobile, Android, iOS or any other type of operation system, and the user may operate the first information sharing module 111 of the first body 110 to execute applications such as alarm clock, voice recording, pictures browsing, and so on. Through a connection between the first information sharing module 111 and an external electronic apparatus (e.g., a smart phone, a tablet computer, etc.), the first body 110 is capable of receiving a notification of the external electronic apparatus, viewing short message (SMS), receiving phone calls and so on. The user may utilize a sensing function (e.g., for acceleration, heartbeat, etc.) of the sensing module 151 of the second body 150 to perform detections in many manners for living conditions of the user. Based on the above, it can be known that both of the first body 110 and the second body 150 are both capable of operating independently. The invention focuses in combining the two bodies capable of operating independently (i.e., the first body 110 and the second body 150), such that the combined assembled electronic apparatus 100 may transmit data of the first body 110 and the second body 150 to each other, and integrate functions of first body 110 and the second body 150 so that the first body 110 and the second body 150 may be complementary to each other for co-operation. Detailed structure and a control method of the assembled electronic apparatus 100 are provided as follows.

Figure 2:
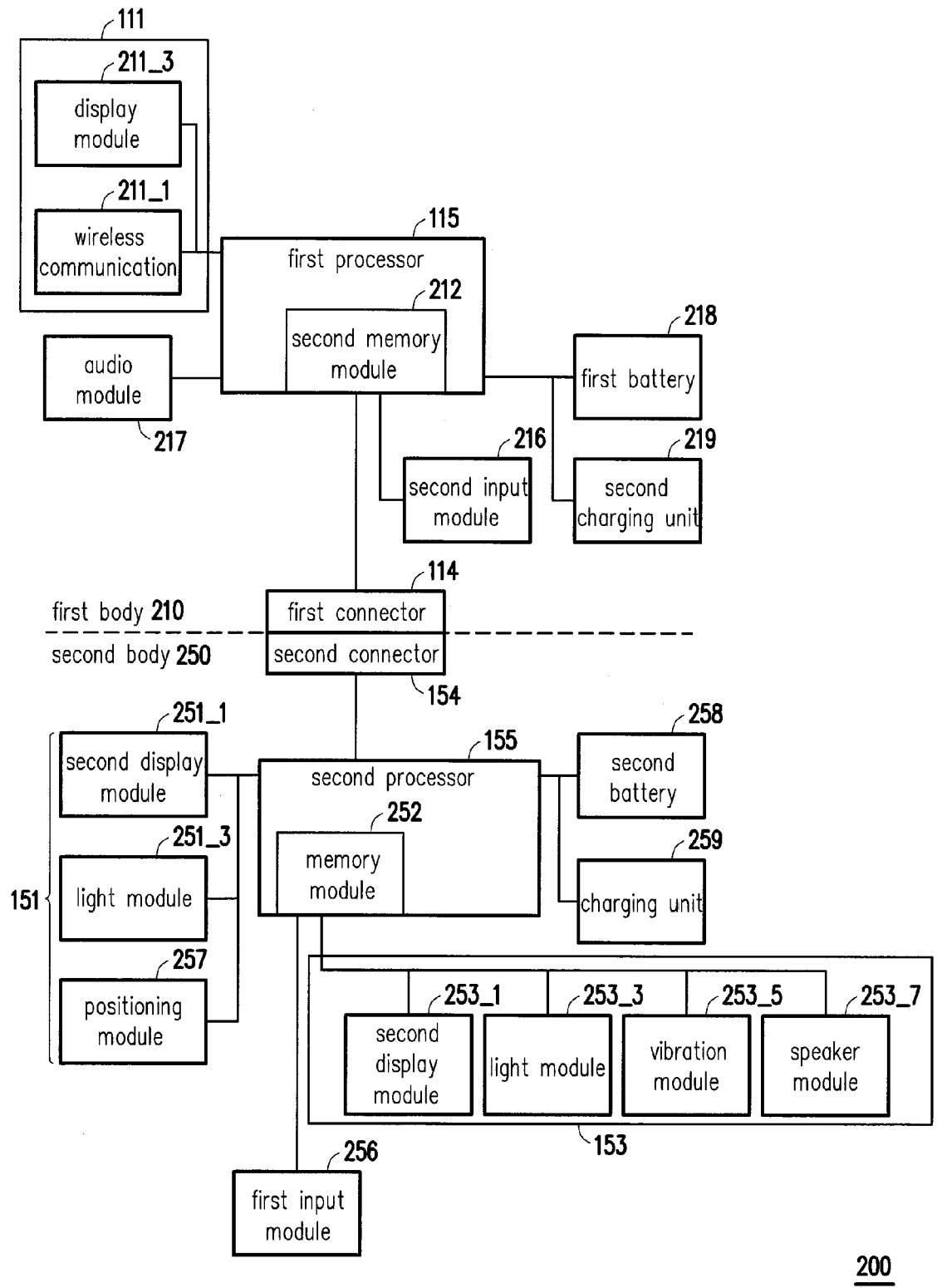
FIG. 2 is an example illustrating the assembled electronic apparatus of FIG. 1 according to an embodiment of the invention.

FIG. 2 is an example illustrating the assembled electronic apparatus 100 of FIG. 1 according to an embodiment of the invention. Referring to FIG. 1 and FIG. 2, an assembled electronic apparatus 200 includes a first body 210 and a second body 250. The first body 210 includes the first information sharing module 111, a second memory module 212, the first connector 114, the first processor 115, a second input module 216, an audio module 217, a first battery 218 and a second charging unit 219, wherein the first information sharing module 111 includes a wireless communication module 211_1 and a display module 211_3. The second body 250 include a G sensor and electronic compass 251_1, a biosensor 251_3, a memory module 252, the second information sharing module 153, the second connector 154, the second processor 155, a first input module 256, a positioning module 257, a second battery 258 and a charging unit 259, wherein the second information sharing module 153 includes a second display module 253_1, a light module 253_3, a vibration module 253_5 and a speaker module 2537. In the present embodiment, an element with the same symbol or reference numeral in FIG. 1 and FIG. 2 refers to an element with similar or identical function, and thus related description thereof is not repeated hereinafter. The sensing module 151 includes the G sensor and electronic compass 251_1, the biosensor 251_3 and the positioning module 257.

The memory module 252 and the second memory module 212 may be a fixed or a movable device in any possible forms including a random access memory (RAM), a read-only memory (ROM), a flash memory or other similar devices, or a combination of the above-mentioned devices. Furthermore, in the present embodiment, the first connector 114 and the second connector 154 have corresponding pins for connecting the first connector 114 and the second connector 154 with each other. The first body 210 and the second body 250 may transmit data via a protocol (e.g., I2C command, UART, etc.) of their interfaces through the first connector 114 and the second connector 154 respectively; and the first body 210 and the second body 250 may provide power to each other through power pins of the first connector 114 and the second connector 154.

The second input module 216 and the first input module 256 may be physical buttons or touch control modules of capacitive-type, resistive-type, optical-type, etc. The audio module 217 may be one of a mono or stereo speaker module and a microphone module, or a combination thereof. In an embodiment, the audio module 217 may be further connected to the external electronic device (e.g., the smart phone, the tablet computer, etc.) through the wireless communication module 211_1 with a bluetooth module, so as to provide functions such as voice control, phone call, audio transmission, etc. The first battery 218 and the second battery 258 may be a rechargeable battery having any capacity or power voltage, such as a nickel-zinc battery, a nickel-metal hydrive (NiMH) battery or a lithium ion battery. The second charging unit 219 and the charging unit 259 are corresponding to the first battery 218 and the second battery 258 respectively. The second charging unit 219 and the charging unit 259 may charge the first battery 218 and the second battery 258 respectively through various type of USB interface (e.g., micro USB, mini USB, etc.).

The wireless communication module 211_1 and the display module 211_3 in the first information sharing module 111 may refer to related description of the first information sharing module 111 of FIG. 1, which is not repeated hereinafter.

The second display module 253_1 may be displays such as a LCD display, an OELD display and so on. In an embodiment, as compared to the display module 211_3 of the first body 210, the second display module 253_1 may be a display that displays less item hierarchies; few display colors (e.g., gray scale, 256 bits, etc.), few pixels, poorer resolutions or includes a different circuit layout. The light module 253_3 may be a module including at least one light emitting diode (LED), which is capable of indicating different statuses by ways of different brightnesses, colors, flicker frequencies. The vibration module 253_3 includes, for example, a vibration motor which generates vibrations in a fixed frequency or a variable frequency. The speaker module 253_7 may be a mono or stereo speaker.

The positioning module 257 may be a positioning module supporting at least one of positioning systems including global positioning system (GPS), assisted global positioning system (AGPS), Galileo positioning system or GLObal NAvigation Satellite System (GLONASS).

Figure 3A:
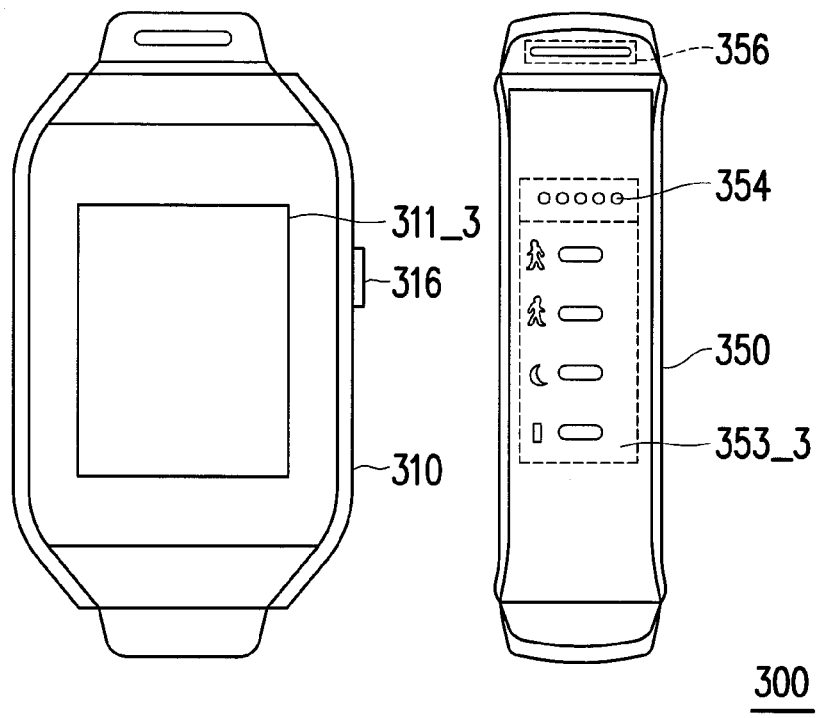
FIG. 3A and FIG. 3B are schematic diagrams illustrating the assembled electronic apparatus of FIG. 2 according to an embodiment of the invention.
Figure 3B:
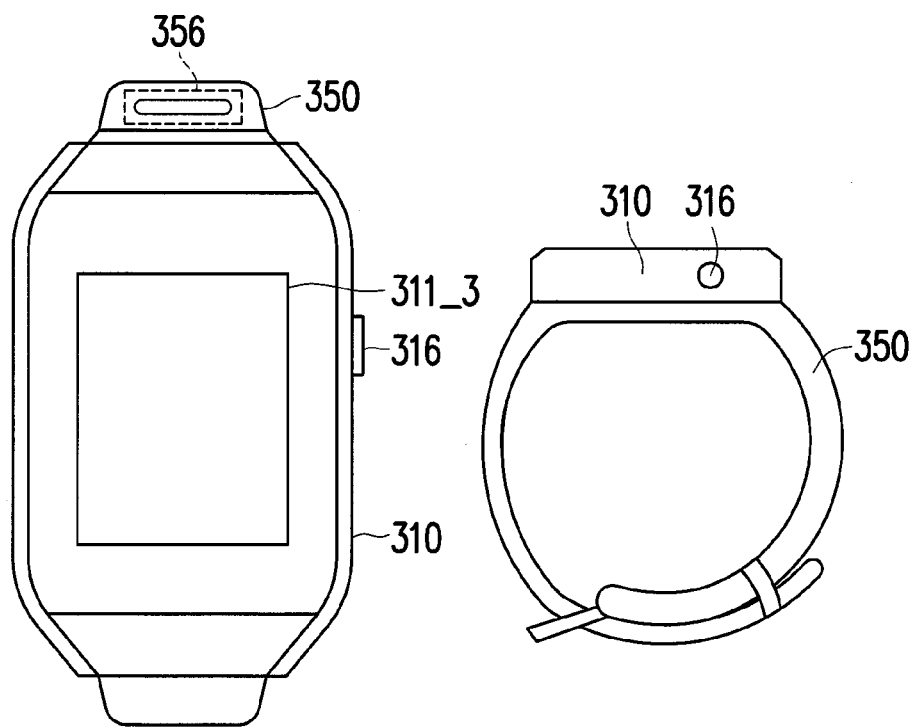

FIG. 3A and FIG. 3B are schematic diagrams illustrating the assembled electronic apparatus 100 of FIG. 2 according to an embodiment of the invention. Referring to FIGS. 1 to 3A, an assembled electronic apparatus 300 includes a first body 310 and a second body 350. The first body 310 includes a display module 311_3 and a physical button 316, wherein the display module 311_3 and the physical button 316 are exemplary examples of the display module 211_3 and the second input module 216 in FIG. 2, respectively. The second body 350 includes a physical button 356, a connector 354 and a plurality of LEDs 353_3, wherein the physical button 356, the connector 354 and the LEDs 353_3 are exemplary examples of the first input module 256, the second connector 154 and the second display module 253_3 in FIG. 2, respectively.

Referring to FIG. 3B, FIG. 3B is a schematic diagram for connecting the first body 310 and the second body 350 depicted in FIG. 3A. A top view in which the first body 310 and the second body 350 are connected is provided at the left of FIG. 3B, and a side view in which the first body 310 and the second body 350 are connected is provided at the right of FIG. 3B. In the present embodiment, the first body 310 and the second body 350 are electrically connected with each other through the connectors of their own (e.g., the connector 354). The first body 310 is represented in form of a watch body, and the second body 350 is represented in form of a watch strap. After the first body 310 and the second body 350 are connected, the assembled electronic apparatus 300 may be considered as one single body. It should be noted that, forms, sizes, connection methods and positions of the elements as depicted in FIG. 3A and FIG. 3B are merely examples. In other embodiments, the assembled electronic apparatus 300 may include different forms, sizes, connection methods and positions of elements. A control method of the assembled electronic apparatus 300 after the first body 310 and the second body 350 are connected is described in the following embodiments.

Figure 4:
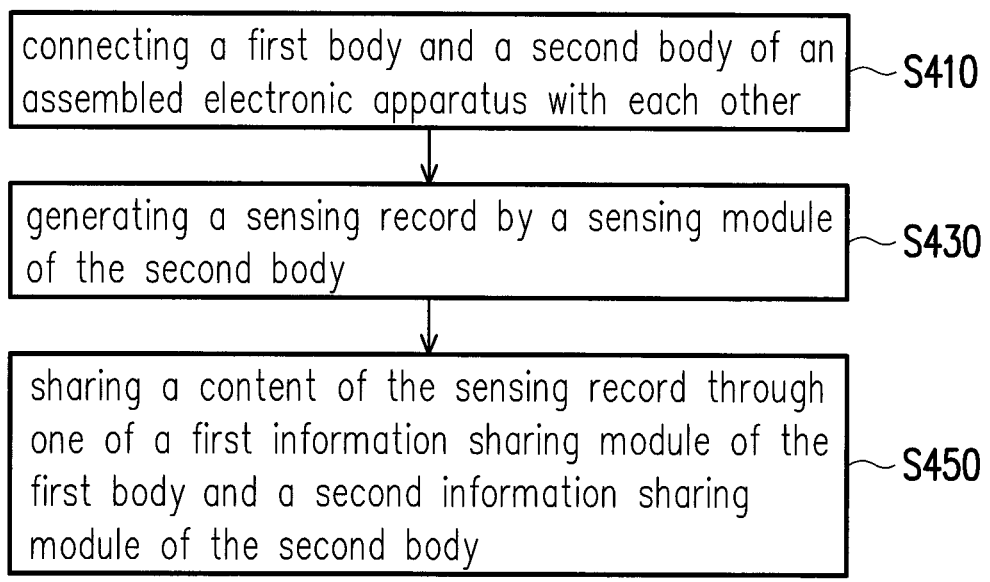
FIG. 4 is a flowchart illustrating a control method of an assembled electronic apparatus according to an embodiment of the invention.

FIG. 4 is a flowchart illustrating a control method of an assembled electronic apparatus according to an embodiment of the invention. Referring to FIG. 4, the control method of present embodiment is adapted to the assembled electronic apparatuses 100, 200, 300 respectively in FIGS. 1 to 3. Hereinafter, the control method according to the embodiments of the invention is described below by reference with various elements in the assembled electronic apparatus 200. Each step in the playing method may be adjusted based on actual conditions, and the invention is not limited thereto.

In step S410, the first body 210 and the second body 250 of the assembled electronic apparatus 200 are connected with each other. Specifically, the assembled electronic apparatus 200 may perform an electrical connection through the method depicted in FIG. 3B, so that the first body 210 and the second body 250 may perform a data transmission respectively through interfaces (e.g., the serial clock (SCL) and the serial data (SDA) of the I2C, the data pins (e.g., D+ and D−) of the USB) of the first connector 114 and the second connector 154.

In step S430, a sensing record is generated by the sensing module 151 of the second body 250. In the present embodiment, the sensing module 151 generates a sensing signal, and the second processor 155 generates the sensing record according to the sensing signal. Specifically, since the second body 250 may include multiple sensing modules 151, various sensing signals may be generated based on sensing technologies (e.g., blood glucose detection, blood oxygen detection, transposition estimation, acceleration measurement, heartbeat detection, etc.) of each of the sensing modules 151. The second processor 155 may convert the sensing signal into the sensing record by performing steps such as quantitative analysis, statical analysis and data analysis on the sensing signal generated by each of the sensing module 151.

In step S450, a content of the sensing record is shared through one of the first information sharing module 111 of the first body 210 and the second information sharing module 153 of the second body 250. In an embodiment, a message is transmitted by one of the first body 210 and the second body 250 to another one of the first body 210 and the second body 250. For example, the second processor 155 transmits the sensing records recorded by the G sensor and electronic compass 251_1 and the biosensor 251_3 through the first connector 114 and the second connector 154 to the first processor 115 (e.g., to the second memory module 212), and the second processor 155 may also transmit a positioning data record by the positioning module 257 to the first processor 115 by using the same method.

In the present embodiment, when the message transmitted by the another one of the first body 210 or the second body 250 is received, a function may be executed through components of the first body 210 and the second body 250 according to the message. In an embodiment, when the first body 210 and the second body 250 are already connected with each other, the second processor 155 transmits the sensing record generated by the sensing module 151 to the first processor 155, and the first processor 115 executes the function to transmit the sensing record to an external apparatus through the wireless communication module 211_1. For instance, the first processor 115 may be connected to the external electronic apparatus (e.g., the smart phone, the notebook computer, etc.) through a communication technology (e.g., bluetooth, NFC, RFID, WiFi, etc.) provided by the wireless communication module 211_1, such that the first processor 155 may then transmit data to the external electronic apparatus. In an embodiment, the first processor 115 transmits the sensing record (e.g., a GPS translocation information, a walked time, etc.) through the bluetooth technology to the external electronic apparatus, and the external electronic apparatus may then display information such as the GPS translocation information and a transposition speed at each section on an electronic map by utilizing a corresponding application. As another example, the first processor 115 may transmit the sensing record (e.g., a heartbeat record, a blood glucose record, a blood oxygenation, etc.) though the NFC technology to the external electronic apparatus. The external electronic apparatus may then perform an analysis to obtain a detection report, and determine whether the detection report is by the standard, so as to determine whether to inform the doctor of such detection report via E-mail. In yet another example, when an audio signal is received the audio module 217, the first processor 115 performs a voice recognition on the received audio signal, so as to determine whether the received audio signal is a voice command. In still another example, when the first processor 115 determines that the received audio signal is the voice command (e.g., for dialing the phone call), the first processor 115 may transmit the voice command through the wireless communication module 211_1 to the external electronic apparatus. Further, after the phone call is put through, the first processor 115 may also transmit voice of such phone call received by the external electronic apparatus through the wireless communication module to the audio module 217 for playing.

In another embodiment, when the first body 210 and the second body 250 are already connected with each other, the second processor 155 transmits the sensing record generated by the sensing module 151 to the first processor 155, and the first processor 115 executes the function to display the sensing record through the display module 211_3. For instance, in regard to the content of the sensing record received by the first processor 115 in step S450, the first processor 115 may organize the sensing record, and then the first processor 115 may display the sensing record (e.g., a blood glucose value, the blood oxygenation, a GPS coordinate, a walked distance, etc.) on the display module 211_3 according to the corresponding application. Alternatively, the first processor 115 may further integrate and analyze the sensing record, and display an analyzed result (e.g., a variation of blood oxygenation per cycle, a total of calories consumed) on the display module 211_3.

In an embodiment, the content of the sensing record shared by the first information sharing module 111 of the first body 210 is different from the content of the sensing record shared by the second information sharing module 153 of the second body 250. For instance, in case the sensing module 151 is a sleep status detector, after the sensing record (e.g., a respiration rate, an amount of turn over, etc.) sensed by the sensing module 151 is received by the second processor 155, a number of light signals on the light module 253_3 (e.g., the LEDs 353_3 of FIG. 3A) may be used to indicate a sleep quality (e.g., it indicates that the sleep quality is good when three of the LEDs 353_3 are lighted, and it indicates that the sleep quality is poor when only one of the LEDs 353_3 is lighted). After the sensing record is received by the first processor 155 through the first connector 114, the sleep quality may be represented in graphics (e.g., specific patterns for indicating a deep sleep state and a light sleep state respectively) on the display module 211_3, or a sensing data (e.g., a respiration rate, an amount of turn over, etc.) may be displayed on the display module 211_3.

Furthermore, in another embodiment, when the first body 210 and the second body 250 are already connected with each other, the second processor 155 transmits an input signal generated by the first input module 256 to the first processor 155, and the first processor 115 executes the function to display the input signal through the display module 211_3. For instance, when the input signal of long press (e.g., a pressed time is more than 2 seconds) is received by the first input module 256, the second processor 155 recalculates the current sensing record, so that the first processor 155 may display the recalculated sensing record on the display module 211_3. As another example, it is assumed that the first processor 115 is currently running an alarm clock program, when the input signal of short press (e.g., the pressed time is less than 2 seconds) generated by a finger of the user on the physical button 353 depicted in FIG. 3A, the first processor 115 may determine to confirm settings of a current alarm clock.

Furthermore, in yet another embodiment, when the first body 210 and the second body 250 are already connected with each other, the first processor 115 transmits an input signal generated by the second input module 216 to the second processor 155, and the second processor 155 executes the function to correspondingly activate the sensing module 151 in the second body 250 according to the input signal. For instance, when a status selection signal (e.g., for selecting a sensing mode) is received by the second input module 216 of the first body 210, the second processor 155 executes sensing functions through the sensing module 151 corresponding to the status selection signal. Specifically, the second body 250 may include multiple sensing modules 151, and an associated sensing record may be used in between each of the sensing modules 151. In an embodiment, the second processor 155 sets a plurality of sensing modes (e.g., sport, sleep, activity modes) to correspond to the different sensing modules 151, or a combination thereof (e.g., the sport mode is corresponding to the G sensor and electronic compass 251_1, the heartbeat sensor and the positioning module 257, and the sleep mode is corresponding to the G sensor and electronic compass 251_1).

Furthermore, in an example, the status selection signal (e.g., for selecting a work mode) is received by the first processor 115 through the second input module 216, the first module 115 is switched to the work mode according to the status selection signal, and the second processor 155 executes the sensing functions corresponding to the status selection signal according to the work mode. Specifically, since the associated sensing record may be used in between each of the sensing modules 151, the second processor 155 may set a plurality of work modes (e.g., flight, office, travel to destination, sport, home modes) to correspond to the different sensing modules 151, the positioning module, applications, or a combination thereof (e.g., the flight mode is corresponding to the G sensor and electronic compass 251_1, the alarm clock program and a setting program, and the office mode is corresponding to the G sensor and electronic compass 251_1, a voice recording program, a briefing program, a timing program, etc.)

In addition, when the input signal is received by the second input module 216, or a corresponding touch signal is received by the display module 211_3 (e.g., the touch signal is received at a position corresponding to a virtual button on the display module 211_3), the first processor 115 uses the input signal as the status selection signal, and the second processor 155 is switched to the corresponding work mode according to the status selection signal. Because the work modes (e.g., flight, office modes) are corresponding to the different sensing modules 151, the positioning module 257, the applications, or a combination thereof, when the first processor 115 determines that corresponding work mode is being switched to, the second processor 155 may then execute the sensing functions (e.g., sensing for transportation, sensing for acceleration, etc.) corresponding to the status selection signal.

On the other hand, the first processor 115 further performs transmission through the wireless communication module 211_1 according to the work mode, and the first processor 115 displays an operation interface through the display module 211_3 according to the work mode (e.g., flight, office modes). For instance, when the first processor 115 determines that the office mode is being switched to, and therefore the operation interface of the voice recording program is displayed, the first processor 115 may transmit an audio message through the bluetooth technology of the wireless communication module 211_1, so as to record sounds through the audio module 217. In another embodiment, when the first processor 115 determines that the home mode is being switched, and therefore the operation interface of a baby monitoring program is displayed, the first processor 115 may transmit an audio message through the bluetooth technology of the wireless communication module 211_1, so as to play monitored sounds through the audio module 217.

Further, in an example, according to the work mode (e.g., flight, office modes), the second processor 155 of the second body 250 may activate the light module 253_3, the vibration module 253_5 or the speaker module 253_7, or a combination thereof; correspondingly. For example, when the first processor 115 is informed through the wireless communication module 211_1 about that E-mail has been received by the already connected external electronic apparatus, the first processor 115 displays a notification message of the E-mail on the display module 211_3, and the first processor 115 may further notify the user by a vibration through the vibration module 253_3, or by flashing with a specific frequency through the light module 253_3, or even sending a beep through the speaker module 253_7.

Furthermore, in another embodiment, when the corresponding touch signal (e.g., the touch signal is received at a position corresponding to a virtual button on the display module 211_3) is received by the display module 211_3, or the input signal is received by the first input module 256 of the second body 250, the second processor 155 may use the input signal as the status selection signal (e.g., for selecting a sensing mode), and the second processor 155 is switched to the corresponding sensing mode (e.g., sport, sleep, activity modes) according to the status selection signal. Because the sensing modes are corresponding to the different sensing modules 151, or a combination thereof, when the second processor 155 determines that corresponding sensing mode is being switched to, the second processor 155 may then execute the sensing functions (e.g., sensing for transportation, sensing for acceleration, etc.) corresponding to the status selection signal. In addition, according to the status selection signal, the second processor 155 also displays a content corresponding to the status selection signal on the second display module 253_1. For example, the corresponding LEDs 353_3 in the second body 350 of FIG. 3 may flash, emit white light, increase brightness, and so on.

In addition, before step S450, when the first body 210 and the second body 250 are not connected with each other, the second processor 155 stores the sensing record in the memory module 252. After the second body 250 and the first body 210 are connected with each other, the second processor 155 transmits the sensing record from the memory module 252 to the first processor 115 of the first body 210. Specifically, because the sensing module 151 of the second body 250 continuously generates the sensing signal, before the second body 250 is connected with the first body 210, the second processor 155 needs to store the sensing record in the memory module 252, so as to avoid data of the sensing record from being incomplete. In addition, after the second body 250 and the first body 210 are connected with each other, the second processor 155 may access the sensing record in the memory module 252 and transmits the sensing record to the first processor 115.

It should be noted that, in an embodiment, when the first body 210 and the second body 250 are not connected with each other, the second processor 155 uses the input signal as the status selection signal (e.g., for selecting the sensing modes), so as to switch the sensing mode for executing the sensing functions corresponding to the status selection signal. In other words, whenever the input signal is received by the first input module 256, the second processor 155 switches the sensing mode for executing the corresponding sensing functions regardless of whether the second body 250 is connected with the first body 210.

On the other hand, in an embodiment, the first processor 115 and the second processor 155 determine a first capacity of the first battery 218 and a second capacity of the second battery 258 for each other, and transmit the first capacity of the first battery 218 and the second capacity of the second battery 258 to each other. If the first capacity is less than a first threshold (e.g., 30% of a total capacity of the first battery 218) and the second capacity is greater than a second threshold (e.g., 20% of a total capacity of the second battery 258), the second processor 155 executes the function to provide power from the second battery 258 to the first body 210. Specifically, the first processor 115 and the second processor 155 may determine the first capacity of the first battery 218 and the second capacity of the second battery 258 respectively through interfaces such the I2C or the System Management Bus (SMBus). Further, the first processor 115 and the second processor 155 may both transmit power through the power pins of the second connector 154 and the first connector 114. Therefore, the second charging unit 219 may charge the first battery 218 through the first connector 114, so that the first battery 218 may obtain power from the second battery 258. Alternatively, the charging unit 259 may also charge the second battery 258 through the second connector 154, so that the second battery 258 may obtain power from the first battery 218.

The charging unit 259 is coupled to the second processor 155 and the second battery 258, and the second processor 155 charges the second battery 258 through the charging unit 259. In an embodiment, after the first body 210 and the second body 250 are connected with each other, the second processor 155 compares the first capacity with the second capacity, so as to determine a sequence for charging the first battery 218 and the second battery 258 through the charging unit 259. For instance, when the first capacity of the first battery 218 is less than 30% of the total capacity of the first battery 218 and the second capacity of the second battery 258 is grater than 20% of the total capacity of the second battery 258, the second processor 155 first charges the first battery 218 through the charging unit 218 until the first capacity reaches 40% of the total capacity of the first battery 218, and the second processor 155 may then control the charging unit 259 to charge the second battery 258.

Figure 5:
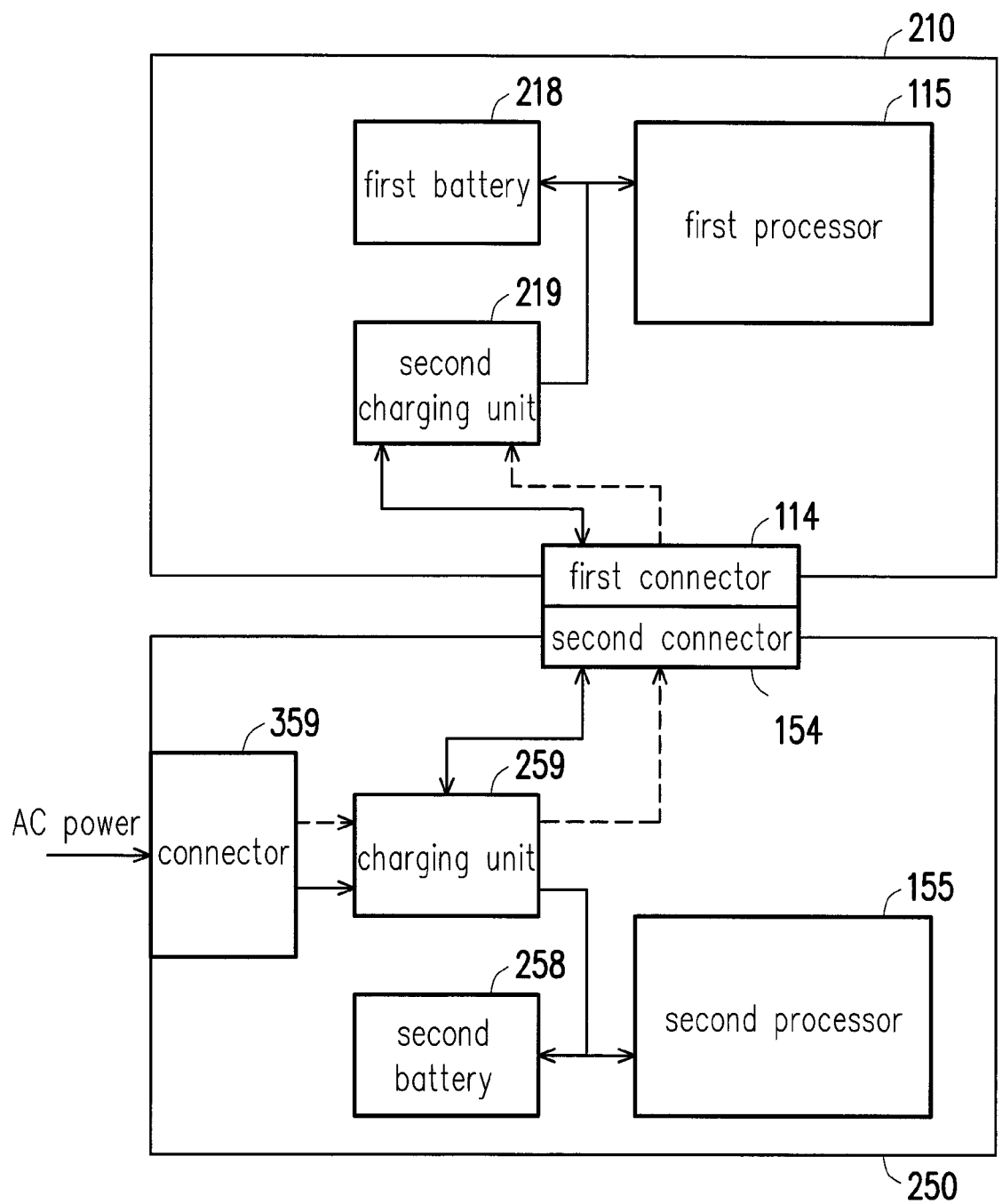
FIG. 5 is a schematic diagram illustrating a charging process according to an embodiment of the invention.

For instance, FIG. 5 is a schematic diagram illustrating a charging process according to an embodiment of the invention. Referring to FIG. 5, the same reference numeral in FIG. 5 represent the same or similar element in FIG. 2, and thus related descriptions thereof are not repeated hereinafter. Further, for illustrative convenience, FIG. 5 only illustrates a part of the elements related to the charging process for example, but the invention is not limited thereto. The first battery 218 and the second battery 258 may execute the charging process respectively through the second charging unit 219 and the charging unit 259, so as to provide, for example, DC power to the first processor 115 and the second processor 155 respectively. The second charging unit 219 and the charging unit 259 may also provide, for example, AC power respectively through the first connector 114 and the second connector 154. In the present embodiment, the second body 250 further includes a connector 359, and the connector 359 is configured to receive AC power (e.g., city power in 100 volt or 200 volt) from the outside. When the first capacity of the first battery 218 is 20% of the total capacity of the first battery 218 and the second capacity of the second battery 258 is 50% of the total capacity of the second battery 258, the second charging unit 219 may obtain AC power inputted by the connector 359 through a path in dash lines. When the first capacity of the first battery 218 is 31% of the total capacity of the first battery 218 and the second capacity of the second battery 258 is 40% of the total capacity of the second battery 258, the charging unit 219 may start to charge the second battery 258 by AC current inputted by the connector 359. Furthermore, in other embodiments, a connector may also be disposed in the first body 210 for receiving external power, and the first processor 115 and the second processor 155 may determine the first capacity and the second capacity, so as to determine the sequence for charging the first battery 218 and the second battery 258.

Moreover, in an embodiment, the second processor 155 may use the light module 253_3 (e.g., the LEDs 353_3 depicted in FIG. 3) in the second information sharing module 153 to indicate the second capacity of the second battery 258. For example, a quantity of the second capacity may be informed by using different brightnesses, different colors, different flicker frequencies, and so on. In other embodiments, the second processor 155 may also use one of the vibration module 253_5 or the speaker module 253_7, or a combination thereof to indicate the second capacity of the second battery 258, but the invention is not limited thereto.

In summary, in the assembled electronic apparatus and the control method thereof according to the embodiments of the invention, after the first body and the second body are connected with each other, the first body and the second body may transmit data to each other through the first connector and the second connector, such that the display module of the first body is capable of displaying the sensing record generated by the sensing module of the second body or the content corresponding to input message received by the first input module, and even executing the corresponding sensing functions according to the status selection signal. Accordingly, functions of the first body and the second body which are capable of operating independently may be combined together for co-operation.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A wearable assembled electronic apparatus, for being fastened around a wrist of an individual, comprising:
a first body, comprising:
a first connector;
a first information sharing module;
a first processor, coupled to the first connector and the first information sharing module; and
a second input module, coupled to the first processor; and
a second body, comprising:
a second connector;
a second information sharing module;
at least one sensing module; and
a second processor, coupled to second connector, the second information sharing module and the at least one sensing module, wherein the second processor shares a partial content of the at least one sensing record generated by at least one sensing module through the second information sharing module,
wherein the first body and the second body being connected assembled with each other through the first connector and the second connector, and after connecting assembling with each other, the first body is carried by a strap of the second body to form the wearable assembled electronic apparatus, and a message is transmitted by one of the first processor and the second input module to another one of the first processor and the second processor, so that a function is executed by the another one of the first processor and the second processor through the corresponding first processor or the corresponding second processor according to the message, and the first processor shares a content of the at least one sensing record generated by the at least one sensing module through the first information sharing module,
wherein when the first body and the second body are assembled with each other, the first processor transmits an input signal generated by the second input module to the second processor, and the second processor executes the function to correspondingly activate the at least one sensing module in the second body according to the input signal,
wherein the at least one sensing module comprises one or more of a biosensor, an oxygen sensor, a heartbeat sensor, a temperature sensor, a position sensor and a G sensor, and generates a sensing signal, and the second processor generates the sensing record according to the sensing signal,
wherein when the first body and the second body are not assembled with each other, the second processor stores the sensing record in a memory module of the second body, and after the second body and the first body are assembled with each other, the second processor transmits the sensing record from the memory module to the first processor of the first body, and the first processor executes the function to display the sensing record through the first information sharing module.

2. The assembled electronic apparatus of claim 1, wherein the first information sharing module is one of a wireless communication module or a display module, or a combination thereof.

3. The assembled electronic apparatus of claim 1, wherein the second information sharing module is one of a second display module, a light module, a vibration module or a speaker module, or a combination thereof.

4. The assembled electronic apparatus of claim 2, wherein when the first body and the second body are connected assembled with each other, the first processor executes the function to transmit the at least one sensing record through the wireless module to an external apparatus.

5. The assembled electronic apparatus of claim 1, wherein the second body further comprises:
a first input module, coupled to the second processor, wherein when the first body and the second body are connected assembled with each other, the second processor transmits an input signal generated by the first input module to the first processor, and the first processor executes the function to display the input signal through the first information sharing module.

6. The assembled electronic apparatus of claim 1, wherein the first body further comprises:
a first battery, coupled to the first processor; and
the second body, further comprising:
a second battery, coupled to the second processor, wherein the first processor and the second processor determine a first capacity of the first battery and a second capacity of the second battery for each other, and transmit the first capacity of the first battery and the second capacity of the second battery to each other, and wherein if the first capacity is less than a first threshold and the second capacity is greater than a second threshold, the second processor executes the function to provide power from the second battery to the first body.

7. The assembled electronic apparatus of claim 6, wherein the second body further comprises:
a charging unit, coupled to the second processor and the second battery, and the second processor charging the second battery through the charging unit.

8. The assembled electronic apparatus of claim 7, wherein when the first body and the second body are connected assembled with each other, the second processor compares the first capacity with the second capacity, so as to determine a sequence for charging the first battery and the second battery through the charging unit.

9. A control method of a wearable assembled electronic apparatus for being fastened around a wrist of an individual, comprising:
connecting assembling a first body and a second body of the assembled electronic apparatus with each other, wherein the first body is earned by a strap of the second body to form the wearable assembled electronic apparatus;
generating at least one sensing record by at least one sensing module of the second body; and
sharing a content of the at least one sensing record through one of a first information sharing module of the first body and a second information sharing module of the second body,
wherein the at least one sensing module comprises one or more of a biosensor, an oxygen sensor, a heartbeat sensor, a temperature sensor, a position sensor and a G sensor, and generates a sensing signal, and the second processor generates the sensing record according to the sensing signal,
wherein when the first body and the second body are not assembled with each other, a second processor stores the sensing record in a memory module of the second body, and after the second body and the first body are assembled with each other, the second processor transmits the sensing record from the memory module to a first processor of the first body, and the first processor executes the function to display the sensing record through the first information sharing module.

10. The control method of the assembled electronic apparatus of claim 9, further comprising:
transmitting the at least one sensing record through the first information sharing module of the first body to an external apparatus.

11. The control method of the assembled electronic apparatus of claim 9, wherein the content of the at least one sensing record shared by the first information sharing module of the first body is different from the content of the at least one sensing record shared by the second information sharing module of the second body.

* * * * *